United States Patent
Kang et al.

(10) Patent No.: US 6,266,470 B1
(45) Date of Patent: Jul. 24, 2001

(54) OPTICAL SWITCH MODULE HAVING A BUFFER DEVICE FOR MINIMIZING A POST WELDING SHIFT

(75) Inventors: Seung Goo Kang; Min Kyu Song; Hee Tae Lee; Sang Hwan Lee; Nam Hwang; Seong Su Park, all of Daejeon (KR)

(73) Assignees: Electronics and Telecommunications Research Institute, Daejeon; Korea Telecom, Sungnam-si, both of (KR)

( * ) Notice: Subject to any disclaimer, the term of this patent is extended or adjusted under 35 U.S.C. 154(b) by 0 days.

(21) Appl. No.: 09/167,537

(22) Filed: Oct. 7, 1998

(30) Foreign Application Priority Data

Nov. 21, 1997 (KR) .................................................. 97-61818

(51) Int. Cl.⁷ .................................................. G02B 6/00
(52) U.S. Cl. .............................. 385/137; 385/88; 385/94; 385/136
(58) Field of Search .................................... 385/4–14, 88, 385/89, 90, 91, 92, 93, 94, 136, 137, 147; 219/121.64, 121.85; 372/21–23, 43, 45, 38; 357/38

(56) References Cited

U.S. PATENT DOCUMENTS

| | | | |
|---|---|---|---|
| 4,838,639 | * | 6/1989 | Morankar et al. ...................... 385/88 |
| 5,136,353 | * | 8/1992 | Pankove et al. ........................ 357/38 |
| 5,247,530 | | 9/1993 | Shigeno et al. . |
| 5,619,609 | * | 4/1997 | Pan et al. ............................. 385/136 |
| 5,930,430 | * | 7/1999 | Pan et al. ............................... 385/94 |

OTHER PUBLICATIONS

Min Kyu Song et al., "Laser Weldability Analysis of High-–Speed Optical Transmission Device Packaging", IEEE Transactions on Components, Packaging, and Manufacturing Technology–Part B. vol. 19, No. 4, Nov. 1996.

* cited by examiner

Primary Examiner—Frank G. Font
Assistant Examiner—Sang H. Nguyen
(74) Attorney, Agent, or Firm—Jacobson Holman PLLC

(57) ABSTRACT

An optical switch module for aligning and fixing an optical fiber array relative to an optical switch device includes an optical fiber support member for fixing the optical fiber array; a first support device forming a homo-junction with the optical fiber support member and including a first thermal deformation buffer device; and a second support device forming a hetero-junction with the first support device to support the first support device and including a second thermal deformation buffer device.

6 Claims, 4 Drawing Sheets

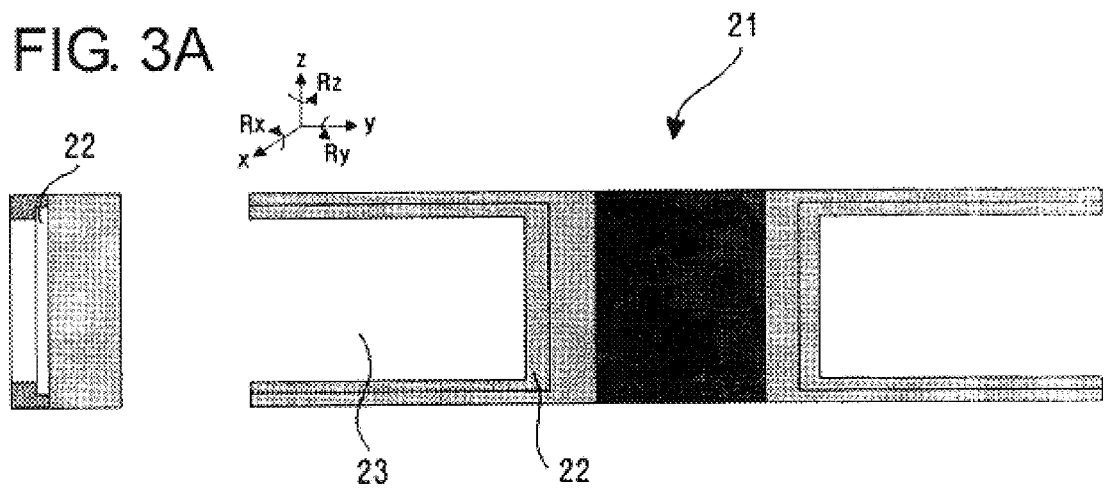
FIG. 3A
FIG. 3B
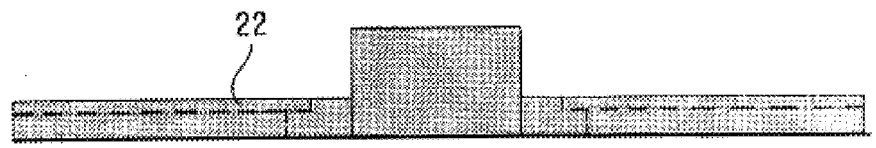
FIG. 3C
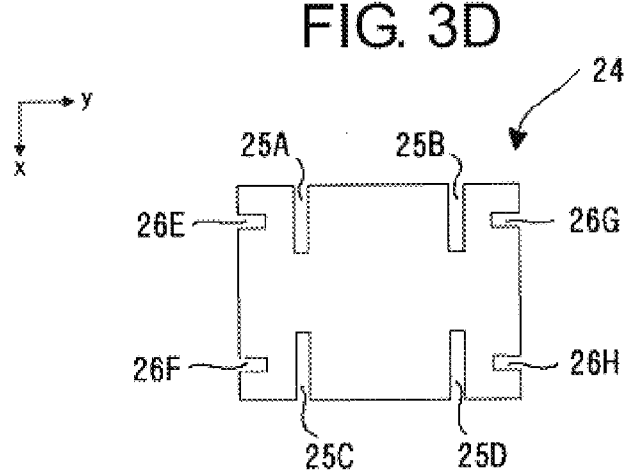
FIG. 3D
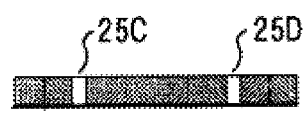
FIG. 3E

OPTICAL SWITCH MODULE HAVING A BUFFER DEVICE FOR MINIMIZING A POST WELDING SHIFT

FIELD OF THE INVENTION

The present invention relates to an optical switch module; and, more particularly, to an optical switch module having a buffer device which is capable of effectively minimizing the influence of the temperature variation on the module performance.

DESCRIPTION OF THE PRIOR ART

Generally, an optical switch module includes an optical switch device and optical input output portions, each having an optical array assembled on a V-groove substrate for multi-channel. The optical components, e.g., the optical switch device and the optical fiber array are aligned to have a maximum optical coupling efficiency, and fixed or assembled in a module case.

Referring to FIGS. 1A and 1B, there are shown a top plan view and a front elevational view of a conventional optical switch module, respectively and referring to FIGS. 2A and 2B, there are shown a top plan view and a front elevational view of a submodule contained in the conventional optical switch module.

The conventional optical switch module includes a submodule and a package case. As shown, in the submodule, an optical switch device 1 is fixed on a ceramic chip carrier substrate 6 by using a die bonding and a wire bonding techniques at a center portion of a submodule substrate 5. At each side of the submodule substrate 5, an optical array 4 is assembled on the optical carrier substrate 9 and fixed through an optical fiber housing 7 and an optical fiber support member 8 by using a laser welding technique. The welding points are indicated by welding spots 11, 12, 27, 28 and 29. The submodule has a project portion on which the chip carrier is mounted to thereby facilitate to align it with the optical fiber. On the other hand, in order to maintaining a constant operating temperature of the optical switch device, a temperature detection device 10 is attached on the submodule substrate 5. For employing the laser welding technique, a stainless 304L or KOVAR can be preferably used as a structural material, but a material of the submodule substrate 5 can be made of Cu—W in order to obtain an effective thermal propagation from the optical switch device to a thermoelectric cooling device, e.g., a heat sink, 13 and to facilitate the application of the laser welding technique.

As shown, the optical fiber array 4 is fixed on the optical housing 7 of the stainless 304L by using a resin, e.g., epoxy, and aligned to the optical switch device.

That is, in order to provide an uniform optical property to all of optical fibers, the optical fiber array is first aligned in x-, y- and z-axis directions and in rotational directions Rx, Ry and Rz for each axis. Thereafter, in order to obtain a z-axis directional solidification, a first laser welding is provided on a portion between the optical housing 7 and the optical fiber support member 8. The active alignment is repeatedly executed in x- and y-axis directions and a second laser welding is applied to a portion between the optical support member 8 and the submodule substrate 5 to thereby provide a complete submodule. The complete submodule is shown in FIG. 2a.

When the submodule is assembled, the thermoelectric cooling device 13 is mounted on an inner-lower surface of the package case 3 by using In-Sn solder(melting point: 135° C.) and the assembled submodule is fixed on the thermoelectric cooling device 13 by using a thermal conductive epoxy or solder. As shown in FIG. 1a, a Fan-out printed circuit board 14 is fixed to the submodule substrate 5 and through a plurality of signal lines 16 to the package case 3 by using the thermal conductive epoxy or solder. One side signal lines of the printed circuit board 14 are connected to the chip carrier substrate 6 by using a wire bonding, while the other side signal lines thereof are coupled to a number of pins of the package case 17 by using a soldering technique. A protect member made of a rubber material is provided in a hole of the package case surround the optical array. When all of internal components are assembled, the package cap is fixed on the package case by using a seam sealing technique in order to prevent the internal components contacting the outer environment.

An alignment tolerance between the optical switch device and the optical fiber is generally less than about 10 $\mu$m in y-axis, e.g., optical axis of the optical fiber, direction. In contrast, in x- and z-axis, e.g., axes normal to the optical axis, direction, when there is 1 $\mu$m in radial displacement, the coupling efficiency of the optical switch module is decreased below 50% as compared with the maximum optical coupling efficiency. Therefore, a precise and stable aligning and solidifying technique is necessarily required. Furthermore, it is also required that the variation of outer environment does not affect the alignment between the optical fiber and the optical switch device.

In the conventional optical switch module, the submodule substrate 5 is made of Cu—W which has a good thermal conductivity, so that a hetero-junction between the Cu—W and SUS304L is necessarily required in the alignment and solidification of the optical switch module. In the laser welding technique, there is no problem to prepare the optical switch module since the hetero-junction made by using the laser welding can provide a desired high integrity. In contrast, a thermal expansion constant of Cu—W is 6.5× $10^{-6}/°$ C., while a thermal expansion constant of SUS304L is 18.7×$10^{-6}/°$ C. As a result, there is a thermal mismatching between the Cu—W and SUS304L.

In general, the optical switch module is tested by using a temperature cycling experiment in the range of −40 to +85° C. On the other hand, the distance between the two hetero junctions is 6 mm in x-axis direction (3 mm in a longitudinal direction). Under −40° C., the SUS304L is deformed 7.1 $\mu$m (3.5 $\mu$m in the longitudinal direction), while Cu—W is deformed 2.5 $\mu$m (1.2 $\mu$m in the longitudinal direction) due to thermal contraction. Therefore, the difference between the deformations of SUS304L and Cu—W is about 4.6 $\mu$m (2.3 $\mu$m in the longitudinal direction). On the other hand, it is known that the plasticity recovery rate of a metal is 0.2% and, when the deformation of metal, is less than 0.2% in size, the deformation can be recovered. The size of welding portions is in range of the 300–400 $\mu$m and 0.2% thereof becomes about 0.6–0.8 $\mu$m. Therefore, the above deformation difference cannot be recovered and the welding portion may be destroyed. Furthermore, a mechanical stress may be hardly applied to the welding portion since, in the temperature cycling experiment, the temperature varies in the range from −40 to +85° C. and the deformation difference can reach about, 5–9 $\mu$m. Consequently, there is a disadvantage that the welding portion of the conventional optical switch module can be easily affected by the variation of temperature. Further, since there is a hetero-junction between SUS304L and Cu—W which are welded together in the conventional optical switch module, the deformation thereof is greater than that of the homo-junction.

SUMMARY OF THE INVENTION

It is, therefore, an object of the invention to provide an optical switch module having a buffer device, which is capable of effectively providing a stable structure and a minimum thermal deformation under the variation of temperature.

In accordance with one aspect of the present invention, there is provided an optical switch module for aligning and fixing an optical fiber array relative to an optical switch device, comprising: optical fiber support member for fixing the optical fiber array; first support means forming a homo-junction with the optical fiber support member and including a first thermal deformation buffer device; and second support means forming a hetero-junction with the first support means to support the first support means and including a second thermal deformation buffer device.

BRIEF DESCRIPTION OF THE DRAWINGS

The above and other objects and features of the present invention will become apparent from the following description of preferred embodiments given in conjunction with the accompanying drawings, in which:

FIGS. 3A, 3B and 3C describe side, top plan and front elevational views of a submodule substrate in accordance with a preferred embodiment of the present invention, respectively;

FIGS. 3D and 3E illustrate top plan and front elevational views of a base plate in accordance with the preferred embodiment of the present invention, respectively;

DETAILED DESCRIPTION OF THE PREFERRED EMBODIMENTS

Referring to FIGS. 3A, 3B and 3C, there are shown side, top plan and front elevational views of a submodule substrate in accordance with a preferred embodiment of the present invention. The submodule substrate 21 is made of Cu—W and has a partial cut-out portion 23 in order to provide an expansion/contraction in x-axis direction. The partial cut-out portion 23 includes an insertion guide slot 22 for accommodating a base plate 24 shown in FIGS. 3D and 3E.

Referring to FIGS. 3D and 3E, there are shown top plan and front elevational views of the base plate. The base plate 24 is made of SUS304L and fixed on the submodule substrate 21 by using the laser welding process. A plurality of slots 25A, 25B, 25C, 25D, 26E, 26F, 26G and 26H are provided to the base plate 24 in longitudinal and latitudinal direction in order to reduce a mechanical stress due to a different thermal expansion constant from that of Cu—W for the submodule substrate 21.

Figure 1A:
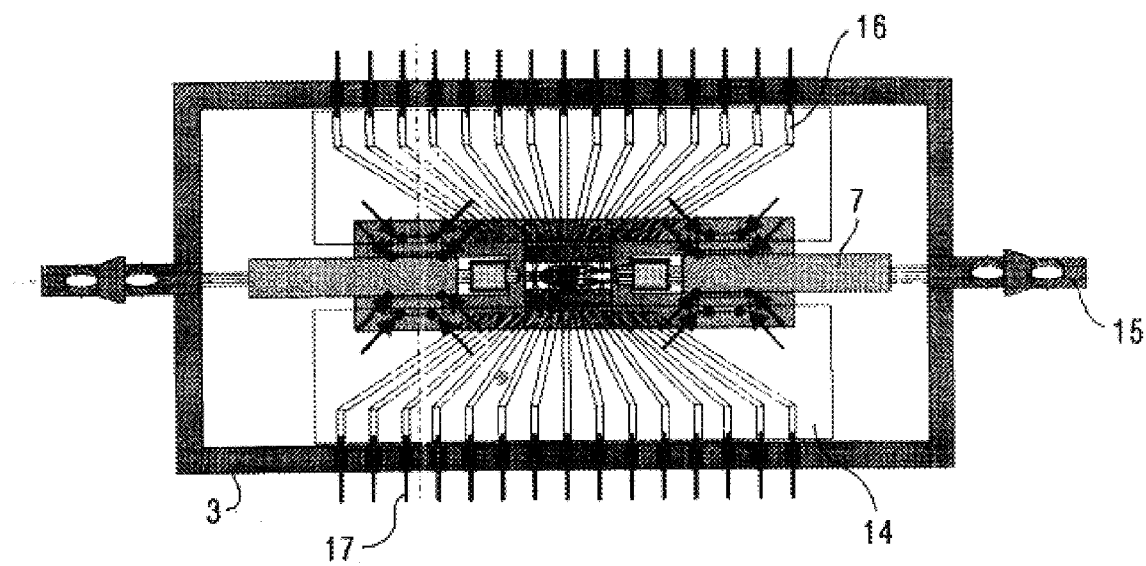
FIGS. 1A and 1B show top plan and front elevational views of a conventional optical switch module, respectively.
Figure 1B:
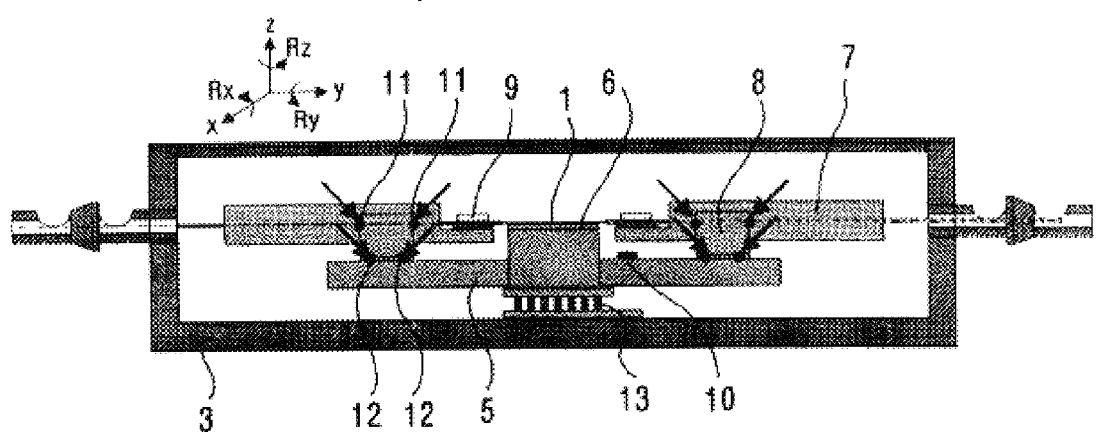
Figure 2A:
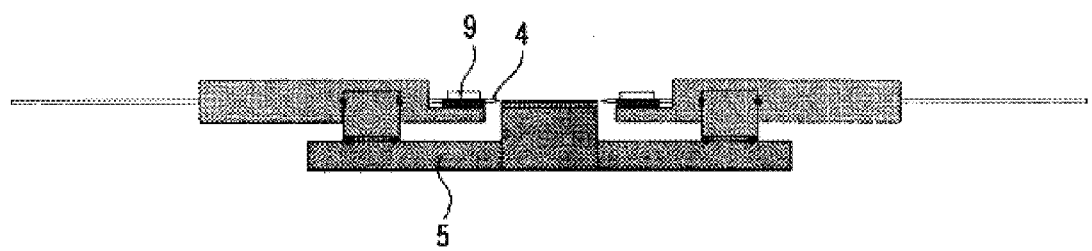
FIGS. 2A and 2B disclose top plan and front elevational views of a submodule of the conventional optical switch module shown in FIGS. 1A and 1B, respectively.
Figure 2B:
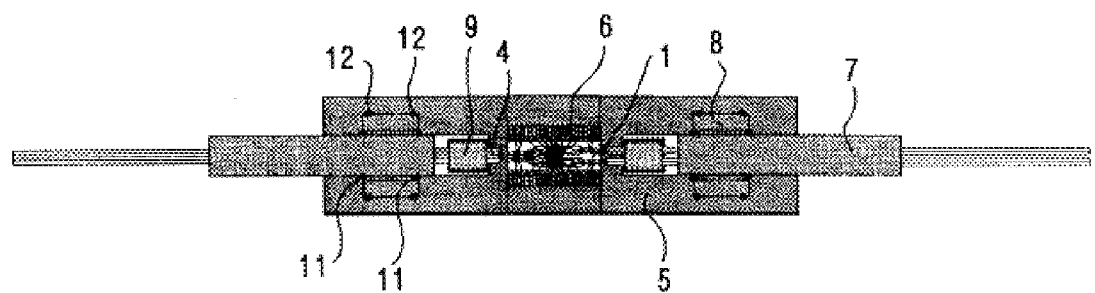
Figure 3F:
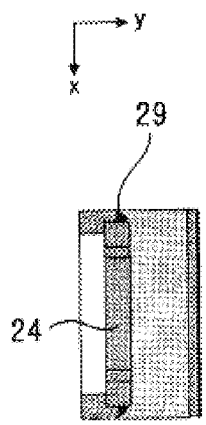
FIGS. 3F, 3G and 3H demonstrate side, top plan and front elevational views of an assembled structure of the submodule substrate and the base plate in accordance with the preferred embodiment of the present invention, respectively.
Figure 3G:
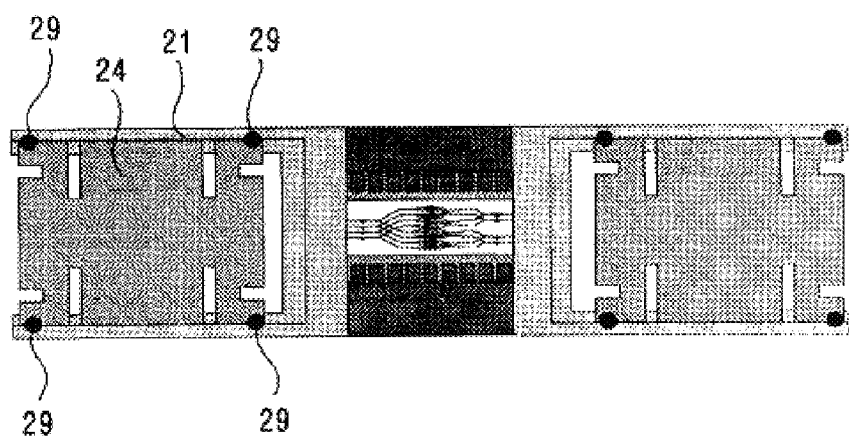
Figure 3H:
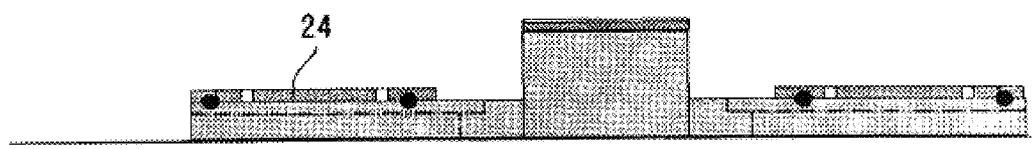

Referring to FIGS. 3F, 3G and 3H, there are shown side, top plan and front elevational views of the assembled base plate 24 and the submodule substrate 21 wherein the base plate 24 is fixed, through 4 number of welded portions 29 formed by using a strong laser, on the submodule substrate 21. As will be described hereinafter, although there is a hetero-junction between the submodule substrate 21 and the base-plate 24, the mechanical stress due to the different thermal expansion constants can be effectively reduced by using the partial cut-out portion 23 and the slot 25A to 25D and 26E to 26H.

Figure 3I:
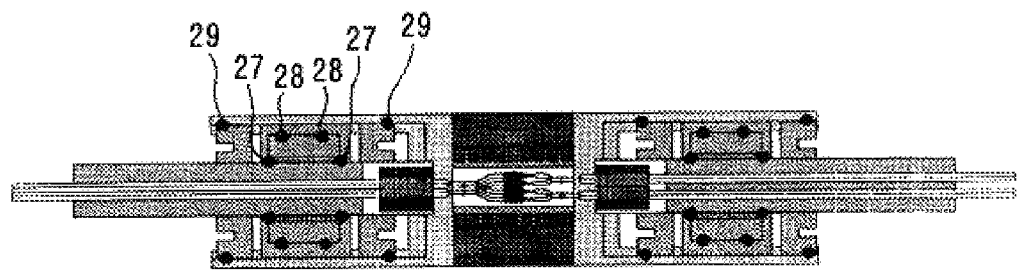
FIGS. 3I and 3J provide top plan and front elevational views of an assembled optical switch module in accordance with the preferred embodiment of the present invention, respectively.
Figure 3J:
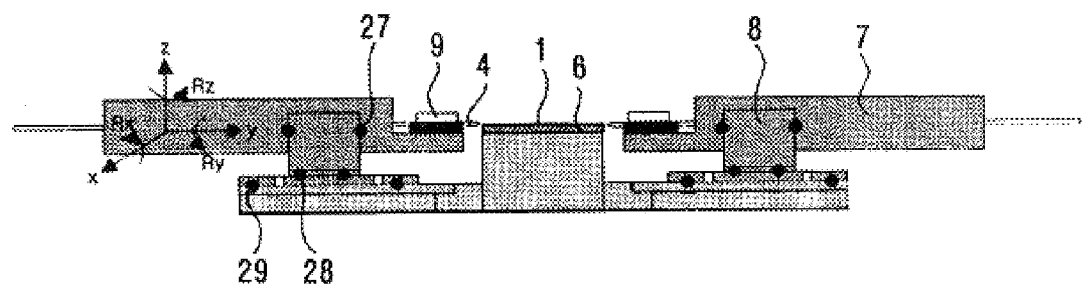

Referring to FIGS. 3I and 3J, there are shown top plan and front elevational views of the assembled submodule. As shown, an optical fiber support member 8 is fixed on the base plate 24 by using the laser welding so that a homo-junction is formed therebetween to thereby minimize a post welding shift effect.

As can be seen from the above, in the submodule in accordance with the present invention, the base plate 24 of SUS304L is first fixed on the submodule substrate 21 of Cu—W by using a strong laser beam to thereby form a hetero-junction therebetween. Thereafter, the optical fiber support member 8 is fixed on the base plate 24 in order to form a homo-junction therebetween, so that it should be readily appreciated that the post welding shift can be effectively reduced. Especially, the base plate has a plurality of slots 25A to 25D and 26E to 26H formed in longitudinal and lateral direction in order to effectively disperse or scatter a mechanical stress due to a different thermal expansion coefficient from that of Cu—W for the submodule substrate 21. There are 4 number of hetero-junction welding portions between the base plate 24 of SUS304L and the subimodule substrate 21 of Cu—W and the thermal expansion or contraction in y-axis, e.g., longitudinal, direction due to the variation of temperature can be buffered by using the longitudinal-direction buffer slots 25A, 25B, 25C and 25D to thereby prevent the hetero-junction welding portion from being cracked. On the other hand, the thermal expansion or contraction in x-axis, e.g., latitudinal direction due to the variation of temperature can be buffered by using the latitudinal-direction buffer slots 26E, 26F, 26G and 26H to thereby prevent the hetero-junction welding portion from being cracked. Furthermore, it can be appreciated that the expansion and contraction in the lateral direction can be applied to the submodule substrate 21 by the cut-out portion 23 to thereby provide a more stable temperature property to the optical switch module.

In a normal operation, the optical switch module can be operated at a constant temperature by using a temperature detection device and a thermoelectric cooling device.

Referring back to FIGS. 3I and 3J, the ceramic chip carrier substrate 6 is solidified on a center portion of the submodule substrate 21 by soldering and the semiconductor optical switch device 1 is then fixed thereon by using a die bonding and a wire bonding. The submodule substrate 21 is gripped by the lower tooling of a laser welding system and the base plate 24 is located on the cut-out portion 23 of the submodule substrate 21. The 4 number of corner portions in the base plate 24 are then welded by using a YAG laser of about 5–7 Joule per a beam to thereby form 4 number of the welded portions 29. The optical fiber support member 8 is then located on the base plate 24, and the optical fiber housing on which the optical fiber array 4 is assembled is gripped by a tooling which provides movements of the optical fiber housing in x-, y- and z-axis direction and rotational directions Rx, Ry and Rz for each axis. The optical alignment is then activated in all directions.

Thereafter, the aligned optical array is fixed in z-axis direction. That is, the optical fiber housing 7 and the optical fiber support member are welded by using the laser having an energy of 3–5 Joule per a beam. The optical fiber array is again precisely active-aligned in x-axis and x-axis directions and, in order to solidify the optical fiber array in x-axis and z-axis directions, the optical fiber support 8 and the base plate 24 are solidified by using a second laser welding to thereby form welded portions 28. The assembled submodule is then packaged in the package case with the thermoelectric cooling device to thereby form a complete optical switch module.

As may be seen from the above, the optical switch module of the present invention has a cut out buffer portion contained in the submodule substrate which provides an expansion and contraction in the latitudinal direction to thereby obtain a more stable temperature property thereof. Furthermore, the base plate 24 of SUS304L is first solidified on the submodule substrate 21 of Cu—W by using a strong laser beam to thereby form a hetero-junction therebetween. Thereafter, the optical fiber support member 8 is fixed on the base plate 24 in order to form a homo-junction therebetween, so that it should be readily appreciated that the post welding shift can be effectively reduced. Further, a plurality of slots 25A to 25D and 26E to 26H formed in longitudinal and lateral direction are also provided to the base plate in order to effectively disperse or scatter a mechanical stress due to a different thermal expansion coefficient from that of Cu—W for the submodule substrate 21.

While the present invention has been shown and described with reference to the particular embodiments, it will be apparent to those skilled in the art that many changes and modifications may be made without departing from the spirit and scope of the invention as defined in the appended claims.

What is claimed is:

1. An optical switch module for aligning and fixing an optical fiber array relative to an optical switch device, comprising:
    an optical fiber support member for fixing the optical fiber array;
    a base plate provided with a first thermal deformation buffer for supporting the optical fiber support member; and
    a submodule substrate provided with a second thermal deformation buffer for supporting the base plate,
    wherein the first deformation buffer is provided with a plurality of slots formed in longitudinal and latitudinal directions to reduce a mechanical stress.

2. The optical switch module as recited in claim 1, wherein the submodule substrate includes a central portion for supporting the optical switch device and at least one end portion for supporting the base plate.

3. The optical switch module as recited in claim 2, wherein the submodule substrate includes cutout portions.

4. The optical switch module as recited in claim 3, wherein the optical fiber support member and the base plate are made of SUS304L.

5. The optical switch module as recited in claim 4, wherein the submodule substrate is made of Cu—W.

6. The optical switch module as recited in claim 5, wherein the submodule substrate is fixed with corner portions of the base plate by using a laser welding.

* * * * *